Oct. 6, 1942.  D. L. GOVONI  2,297,884
GEAR SHIFT LEVER HANDLE CONSTRUCTION
Filed Feb. 2, 1942
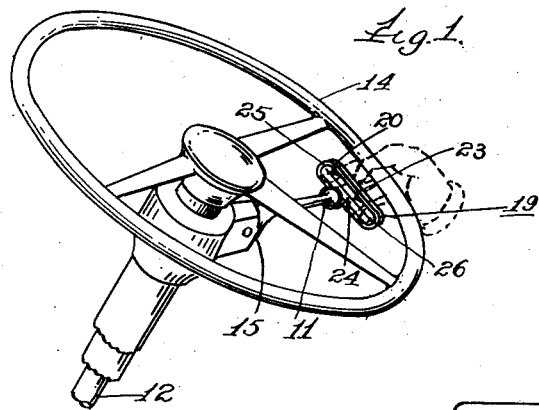
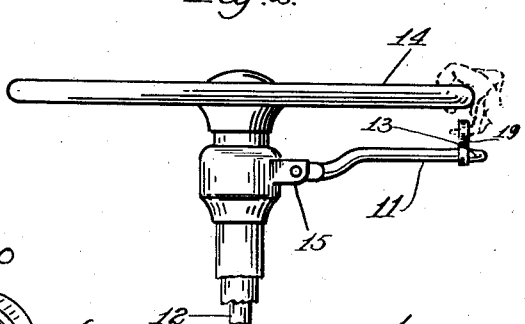
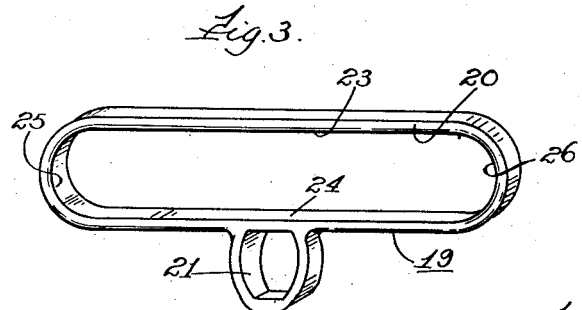
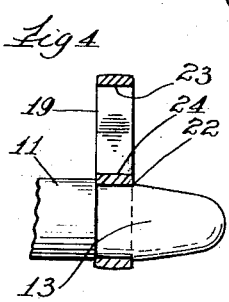
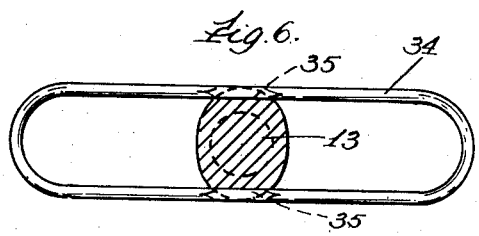
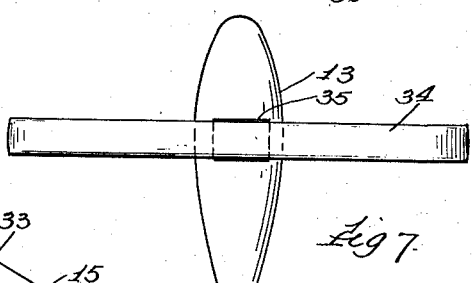
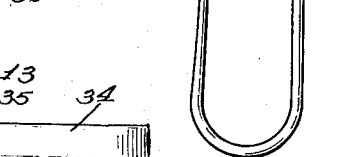
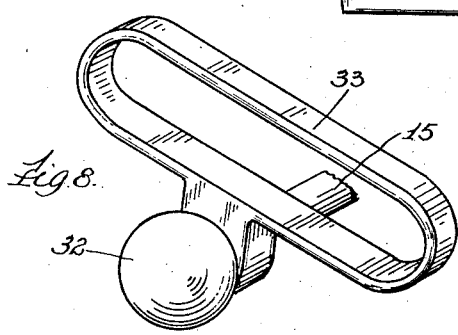
Inventor
Delmo L. Govoni.
by James R. McKnight
Attorney.

Patented Oct. 6, 1942

2,297,884

UNITED STATES PATENT OFFICE 2,297,884

GEARSHIFT LEVER HANDLE CONSTRUCTION

Delmo L. Govoni, Joliet, Ill.

Application February 2, 1942, Serial No. 429,167

3 Claims. (Cl. 74—484)

My invention relates to a stirrup for a gear shift lever handle adapted to facilitate the shifting of gears by the driver of an automobile without requiring the driver to remove either hand from the steering wheel during the shifting operation.

My device is designed to operate on gear shift control levers which are mounted adjacent and slightly below the steering wheel. This type of gear shift lever has been in use for several years and is now standard equipment on most makes of automobiles.

Among the objects of my invention are to provide a stirrup for a steering wheel type gear shift lever whereby the shifting operation may be performed easily and perfectly by the use of the fingers of the right hand of the driver, while the remainder of the hand remains on the steering wheel to aid in the steering control of the automobile. A further object of my invention is to provide a stirrup which will operate on any type of steering wheel gear shift lever, whether the same is operated by manual force or partially by manual force and partially by power, as in recent models.

A further object of my invention is to provide a stirrup which will permit safe and quick movement of the gear shift lever without the danger of serious damage to the gear mechanism of the automobile, which might result from imperfect movement of the gear shift lever.

My invention contemplates such other objects, advantages, and capabilities as will later more fully appear and which are inherently possessed by my invention.

While I have shown herein preferred embodiments of my invention, yet I wish it understood that the same are susceptible of modification and change without departing from the spirit of my invention.

Referring to the drawing, Fig. 1 is a perspective view of a steering wheel with my gear shift lever handle construction; Fig. 2 is a front elevational view of the same; Fig. 3 is a perspective detailed view of the preferred form of my stirrup; Fig. 4 is a sectional view showing the same attached to the lever; Fig. 5 is an elevational view showing another embodiment of my stirrup about to be attached to the lever; Fig. 6 shows said embodiment in place; Fig. 7 is a top elevational view of the construction shown in Fig. 6; Fig. 8 is a perspective view of another embodiment of my invention.

In the type of gear shift lever construction with which my stirrup may be used, the gear shift lever 15 comprises a rod 11, which extends at a right angle from the steering post 12 of the automobile. The rod 11 is in a plane substantially parallel with that of the steering wheel 14. The conventional construction provides a gripping portion 13, which is customarily attached to the outer end of rod 11 by being fastened thereto by screw threads.

This constitutes the gear shifting lever to which my stirrup is to be attached. Without the use of my device, the driver must remove the right hand from the steering wheel and grasp the gripping portion 13 of gear shift lever 15 with the palm and fingers of the right hand and move lever 15 into the proper position to effect a shifting of the gears.

The preferred embodiment of my stirrup 19 comprises a hollow oblong loop 20. Formed integrally with loop 20 is a circular fastening member 21, which is designed to fit over gripping portion 13 of gear shift lever 15. Fastening member 21 is held on gripping portion 13 by friction grip. It may be fastened by cutting notches 22 in gripping portion 13 into which notches the ends of fastening member 21 fit to provide a more secure hold. Loop 20 is preferably formed of metal in the shape of an oblong designed to accommodate the four fingers of the user.

In use, my stirrup 19 is mounted on the gripping portion 13 of gear shift lever 15 by fitting the ends of fastening member 21 into notches 22. Loop 20 of my stirrup 19 is thus mounted above gear shift lever 15. When the driver of the automobile desires to shift gears, he removes his fingers from the steering wheel and inserts them through loop 20. The thumb and part of the palm of the hand of the driver are kept on the steering wheel to aid in the control of the car.

In order to shift the gears to first speed, the driver exerts, through his fingers, upward pressure on the top portion 23 of loop 20 to move gear shift lever 15 upward into the proper plane. This pressure is maintained and at the same time, the fingers of the driver exert pressure on the inner end 26 of loop 20 to move gear shift lever 15 into first speed position. This operation is accomplished with the use of only the fingers of the driver, the thumb and part of the palm of the hand remaining on the steering wheel. The shifting operation is accomplished by the use of the four fingers of the hand of the user, which securely grip loop 20 of my stirrup 19.

My stirrup 19 provides for the exertion of force in all of the four directions necessary for a complete cycle of gear shifting, without any change in the grip on the handle and without the removal of the remainder of the driver's hand from the steering wheel. The shape of my stirrup 19 prevents the fingers of the driver from slipping off during the shifting operation, thus preventing the possibility of serious damage to the gear mechanism of the automobile.

In shifting to second gear from first gear, the fingers of the user exert pressure away from himself on the outer end 25 of loop 20 to move gear shift lever 15 out of first gear position. The backs of the fingers of the driver then exert pressure on the bottom 24 of body member 20 to move gear shift lever 15 into the lower plane.

Although gear shift levers of this type customarily provide some type of force, usually in the form of a coil spring, which normally exerts pressure to maintain the gear shift lever in the lower plane, the user cannot rely on this pressure alone to move the gear shift lever into the lower plane. This is true because the pressure becomes effective only when the gear shift lever is in the position exactly above neutral. If the gear shift lever is moved slightly short of this position, or slightly beyond it, the spring will not function. There is also a delay in waiting for this action to take place, which delay is not customary in the gear shifting habits of most drivers. For this reason my stirrup 19 permits the driver to guide the gear shift lever 15 and facilitate its proper and rapid movement into the lower plane.

After gear shift lever 15 is in the proper plane, the driver exerts pressure on the outer end 25 of loop 20 to move gear shift lever 15 into second speed position.

In shifting from second speed to third, the driver exerts pressure toward himself on the inner end 26 of loop 20 to move gear shift lever 15 out of second speed position and into neutral position. The same type of pressure is then used to move gear shift lever 15 into third speed position.

In shifting from third speed into reverse, the driver exerts pressure on the outer end 25 of loop 20 to move gear shift lever 15 away from himself and into neutral position. Upward pressure is then exerted on upper portion 23 of body member 20 to move gear shift lever 15 into the upper plane. Pressure to keep gear shift lever 15 in the upper plane is maintained and at the same time pressure on the outer end 25 of loop 20 is exerted to move gear shift lever 15 into reverse speed position.

Another embodiment of my invention comprises a ball 32 which will fit by screw threads or friction grip on the end of gear shift lever 15. A loop 33 may be an integral part of the ball 32 to comprise a single attachable unit or it may be a separate unit, which is kept by ball 32 from slipping off of the end of gear shift lever 15.

In order to conserve metal or whatever material I choose to utilize, I may provide a simpler form of my handle as illustrated in Fig. 6. This embodiment comprises only a loop 34 which would fit by friction grip or by the use of notches 35 around gripping portion 13 of gear shift lever 15. This loop 34 would function in the same manner as loop 20 described earlier, with the exception that the fingers of the user would have to be divided above and below the gripping portion 13 of gear shift lever 15.

It will be seen that in all the embodiments of my invention, provision is made for the exertion of pressure in all four directions necessary for the complete shifting cycle without the necessity of the driver removing the remainder of his hand from the steering wheel. My handle provides for a quick, safe and sure shifting operation in all directions without the danger of the fingers of the driver slipping during the shifting operation and causing serious damage to the gear mechanism of the automobile. My stirrup can be used on any type of automobile having a steering wheel type of gear shift because it is so constructed that a great amount of force can be exerted in any direction. It is not applicable solely to power type shifting mechanisms.

Having thus described my invention, I claim:

1. In combination with a steering wheel and a standard gear shift construction having first, second, third and reverse speeds, and a gear shift lever positioned adjacent said steering wheel, a loop straddling said gear shift lever adjacent its outer end, said loop of sufficient length and width above said gear shift lever to snugly receive the outer portions of the first two fingers of the operator and of sufficient length and width below said gear shift lever to snugly receive the outer portions of the last two fingers of the operator, said loop having a lower portion, an upper portion, an inner end portion, and an outer end portion, said portions adapted to receive pressure from the fingers of the operator to move the lever in all of the four required directions to shift into said first, second, third and reverse speeds of said gear shift construction, while the hand of the operating fingers of the operator remains throughout on said steering wheel.

2. In combination with a steering wheel and a standard gear shift construction having first, second, third and reverse speeds and a gear shift lever positioned adjacent said steering wheel, a loop attached to said gear shift lever adjacent its outer end, said loop of sufficient length and width to snugly accommodate the outer portions of the fingers of the operator, said loop having a lower portion, an upper portion, an inner end portion, and an outer end portion, said portions adapted to receive pressure from the fingers of the operator to move the lever in all of the four required directions to shift into said first, second, third and reverse speeds of said gear shift construction, while the hand of the operating fingers of the operator remains throughout on said steering wheel.

3. In combination with a steering wheel and a standard gear shift construction having first, second, third and reverse speeds and a gear shift lever positioned adjacent said steering wheel, a loop attached to said gear shift lever adjacent its outer end, said loop of sufficient length and width to snugly accommodate the outer portions of the fingers of the operator, said loop having a lower portion, an upper portion, an inner end portion and an outer end portion, said upper portion and said inner end portion adapted to receive pressure from the fingers of the operator to move the lever in the directions to shift into first speed, said outer end portion and said lower portion adapted to receive pressure from the fingers of the operator to move the lever in the directions to shift into second speed, said inner end portion adapted to receive pressure from the fingers of the operator to move the lever in the direction to shift into third speed, said outer end portion and said upper portion adapted to receive pressure from the fingers of the operator to move the lever in the directions to shift into reverse speed, the hand of the operating fingers of the operator remaining throughout on said steering wheel.

DELMO L. GOVONI.